May 21, 1963
R. A. BLYTH
3,090,595
CAM ACTUATED BALL VALVE
Filed June 23, 1960
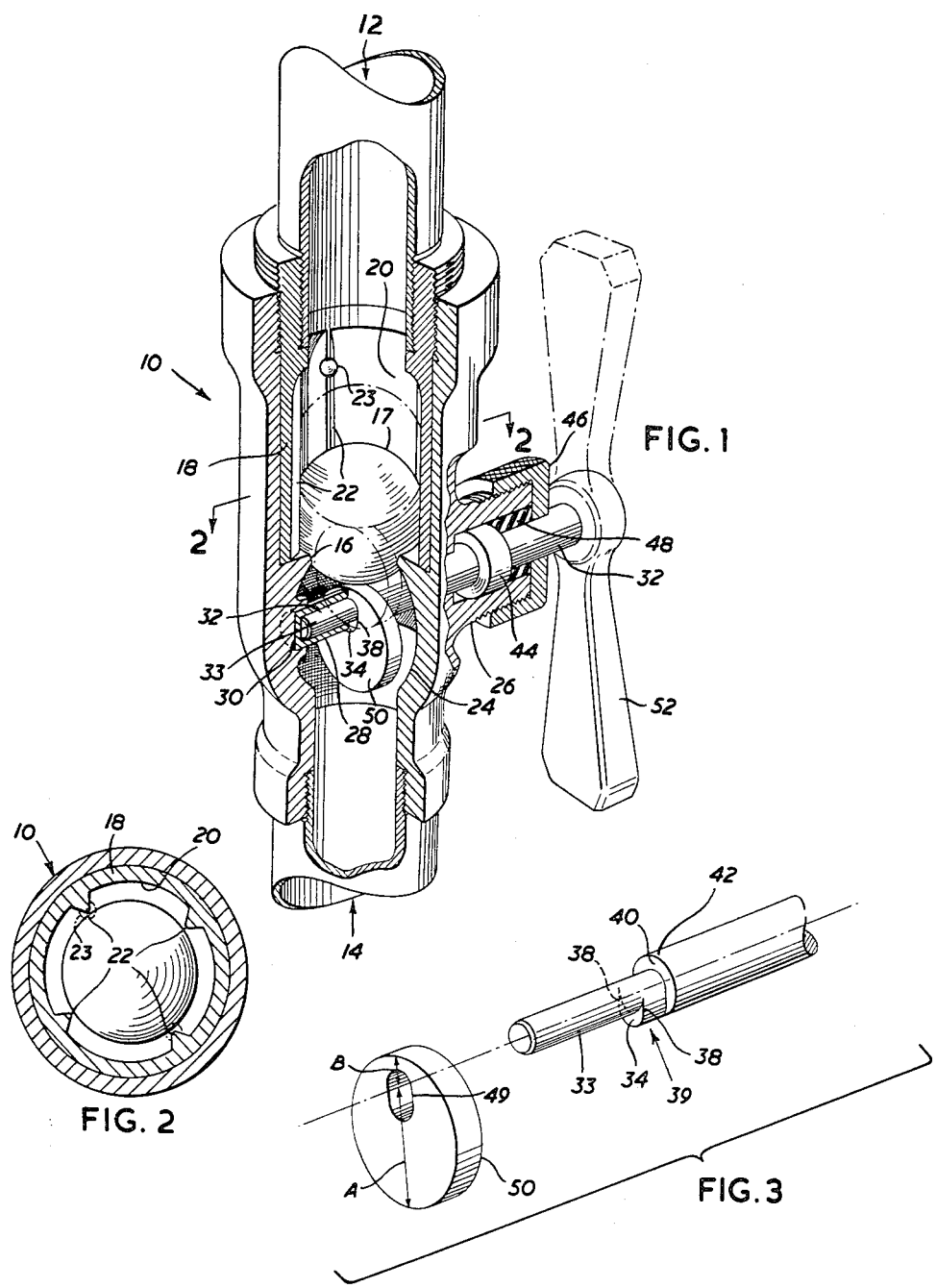
INVENTOR
REGINALD A. BLYTH, DECEASED
BY WALTER E. HARRIS, EXECUTOR
BY *Featherstonhaugh & Co.*
ATTORNEYS 3,090,595
CAM ACTUATED BALL VALVE
Reginald Arthur Blyth, deceased, late of 7 St. Andrews Garden, Toronto 5, Ontario, Canada, by Walter Harris, executor, Markdale, Ontario, Canada
Filed June 23, 1960, Ser. No. 38,392
1 Claim. (Cl. 251—258)

This invention relates to a valve and valve casing construction.

The valve and casing to which the invention is applicable is of the type wherein there is provided a valve casing having an inlet and an outlet end, a valve seat facing the inlet end, a valve located between said seat and said inlet end and adapted to be pressed against said seat by fluid pressure and means controllable from outside said casing for displacing said valve from said seat to allow the passage of fluid. An example of this type of valve is shown in Canadian Patent No. 207,565, issued January 18, 1921, to Albert Harold MacIsaac et al.

By "fluid" is included liquid and gas.

Customarily the means for displacing the valve to allow fluid flow is a cam member mounted on a shaft traversing the casing adjacent to and on the outlet side of the valve, whereby rotation of the shaft will cause the cam to displace the valve from the seat to allow fluid flow, or rotation of the shaft will remove the resistance of the cam to allow the valve to rest on the seat and close off flow.

It has been found that such a valve may be more cheaply and ruggedly produced and reduced in size if the cam and shaft are separate members designed so that they may be asembled inside the casing.

It is necessary in a valve of this type that the inlet end of the assembled valve be provided with stops or keepers to prevent loss of the valve during handling or installation thereof. The presence of such construction makes it difficult to machine the valve seat or alternately it is difficult to attach such construction after machining has taken place. Applicant provides a casing having a bore from the seat to the inlet end, larger than the seat, for easy machining of the latter, and a sleeve which is detachably mounted in said bore, as a liner therefor, after the valve is in place, the liner carrying guides for the valve and keeper to maintain the valve in place. In this way the construction of the valve casing is improved and simplified.

In drawings which illustrate a preferred embodiment of the invention:

FIGURE 1 is a perspective cut-away of valve and casing.

FIGURE 2 is a cross section of valve and casing taken along the line 2—2 of FIGURE 1, and FIGURE 3 is a fragmentary perspective view of elements shown in FIGURE 1.

In the drawings is shown a valve casing 10 which may be of unitary construction having an inlet end 12 and an outlet end 14. A valve seat 16 faces the inlet end 12 and is machined to receive with a fluid tight seal, the valve, in this case, a spherical ball 17.

From the valve seat 16 to the inlet end 12 the bore in the casing 10 is widened radially and the widened portion receives in a sliding fit a sleeve 18 which is detachably fastened to the casing preferably by complementary threading adjacent the inlet end 12. The sleeve 18 has a cylindrical inner surface 20 of appreciably wider diameter than the seat 16, broken by at least three and preferably four inwardly directed guide ridges 22. The guide ridges 22 are spaced to allow the ball 17 to move freely toward and away from the seat 16 but narrow the channel of movement sufficiently to ensure that the ball will always, when allowed, move onto the valve seat 16 to close the valve.

Retainers 23 for the ball 17 are provided on guide ridges 22 adjacent the inlet end and act to prevent escape of the ball from the casing during assembly of the valve or due to back pressure. These retainers are also rounded to prevent injury to the ball valve 17.

The stream space between the ball 17 and the inner surface 20 of the sleeve 18 should be as large or larger than the cross sectional area of the pipe 12. I have found that a space having 25% greater area is satisfactory.

Between the valve seat 16 and the outlet end 14 is provided a valve operation chamber 24 which may be spherical as shown. One wall of casing 10 opposite such chamber is apertured and an exterior boss 26 projects outwardly from the casing. Transversely across the chamber 24 from the aperture there is provided an internal boss 28 projecting almost halfway across the chamber toward the aperture and having a well 30 aligned with the aperture 49.

A shaft 32 is provided with an extremity 33 of a diameter to rotatably seat in the well 30. Just outside the well 30 the shaft is provided with a step 34 to an extent having on one side thereof an outer surface of diameter larger than, but concentric with, the extremity 33. The two diameters are preferably joined by parallel sides 38 to provide an eccentric key 39. On the side of the extent remote from the internal boss 28, a second step 40 is provided to a shaft extent 42 all of which is of the same diameter and concentric with the larger diameter of the key. The shaft extent 42 extends across the remainder of the chamber width and out of the casing through the boss aperture and past the extremity of the boss 26. A packing gland 44 attached to shaft extent 42 supports the shaft on the boss 26 and a cap 46 on the shaft 42 is adapted to screw on the outside of the boss 26. A washer 48 is loosely mounted on the shaft 32 between gland 44 and cap 46 to prevent movement of the bearing and shaft away from internal boss 28 when the cap 46 is tightened in place.

An eccentric cam 50 preferably of circular outline is mounted on key 39 being provided with an aperture 49 complementary to key 39.

The diameter of the cam varies about its circumference from a large radius A which is adapted to contact ball 17 and maintain it spaced from seat 16 to allow the passage of fluid and a small radius B which is adapted to allow ball 17 to seat securely on seat 16 and seal off fluid flow.

A handle 52 is provided for rotation of shaft 32 to control the position of the cam 50.

Means are provided at both the inlet and the outlet ends of the casing for connection to fluid flow conduits.

The operation of the device connected in a fluid flow conduit is as follows:

With radius A of cam 50 extending toward ball 17 the cam holds the ball 17 clear of the seat 16 to allow fluid flow, retainers 23 acting to keep ball 17 in casing 10 in the event of back pressure. To shut off fluid flow the shaft 32 is rotated by handle 52 until the ball 17 is allowed to move under fluid pressure against seat 16. To re-initiate fluid flow the handle is again turned until the cam 50 again displaces the ball 17 from seat 16.

Most of the advantages of the valve construction accrue in the manufacturing and assembling stages. The valve is assembled as follows:

The cam 50 is inserted into the chamber 24 through the inlet end 12. Immediately after shaft 32 is threaded through the aperture corresponding to boss 26, through the aperture 49 in cam 50 so that cam 50 is rotatably fixed in position on key 39 and the extremity 33 is inserted in well 30. Washer 48 and cap 46 are then threaded on shaft 32 and handle 52 placed on the shaft. The cap 46 is then tightened on boss 26 and the shaft and cam unit is operable. It will be noted that the cam 50 is firmly held against lateral movement on shaft 32 between boss 28 and shoulder 40. It will be noted that to dissassemble the shaft and cam from the casing the above procedure is reversed.

Because the cam 50 and shaft 32 may be separately inserted in or withdrawn from the chamber and assembled and dissassembled therein it is possible to make boss 26, chamber 42 and casing 10 smaller than with prior construction. This is because the cam may be inserted through the inlet 12 and also because independently of the size of the cam, the boss 26 may be made smaller since shaft 32 and cam 50 do not have to be inserted therethrough already assembled.

Continuing with the assembly of the valve and assuming shaft and cam are assembled in place as described, the ball 17 is then placed on seat 16 and immediately thereafter the sleeve 18 is screwed into casing 10. Disassembly of ball and sleeve may be achieved by reversing the above process.

The provision of a sleeve carrying the guides and retainers for the ball allows the valve casing to be made in one piece; an improvement over prior constructions which had to be of a complex expensive two piece construction. Moreover the use of a sleeve lining the inlet end provides that the inlet end, before the sleeve is inserted, is appreciably larger than the valve seat. The accurate machining of the seat is thereby greatly facilitated.

It will be appreciated that the shape of cam and key are not critical, that the cam must be eccentric and have a longer radius sufficient to displace the sphere while the key must be of such size as to enter the cam from the side thereof adjacent the boss 26 and to enter through the aperture surrounded by the boss 26.

What is claimed is:

A valve comprising a casing having a through bore with an inlet and an outlet end, a valve seat on said bore facing the inlet end thereof, a valve adapted to seat on said valve seat, means for displacing said valve from said seat manually from the outside of said casing, a sleeve for said bore extending from adjacent said valve seat towards the inlet end of said bore, said sleeve having guide means extending inwardly of the surface thereof adapted to guide the movement of said valve longitudinally of said sleeve and sphere shaped stop means comprising a shoulder on the inside of said guide means for preventing said valve from moving out of said bore, said sleeve also having an inside diameter formed to permit fluid to pass therethrough and consequently through said bore when said valve is lifted from said seat, said sleeve also being screw threaded into said bore and being internally threaded at its end adjacent said inlet end for receiving a threaded pipe.

References Cited in the file of this patent

UNITED STATES PATENTS

| 260,030 | Johnson | June 27, 1882 |
| 299,669 | Montgomery | June 3, 1884 |
| 1,005,044 | Koch | Oct. 3, 1911 |
| 1,225,238 | Gray | May 8, 1917 |
| 1,374,308 | MacIsaac et al. | Apr. 12, 1921 |
| 1,523,575 | Beloit | Jan. 20, 1925 |
| 1,675,979 | Laird | July 3, 1928 |
| 1,796,455 | Gunn et al. | Mar. 17, 1931 |
| 1,901,217 | Yerkes et al. | Mar. 14, 1933 |
| 2,991,724 | Crowl | July 11, 1961 |

FOREIGN PATENTS

| 242,137 | Great Britain | of 1925 |